Sept. 5, 1967 F. E. KLASSEN ETAL 3,340,541
HIGH SPEED PEN ACTUATING MECHANISM
Filed Jan. 18, 1965
2 Sheets-Sheet 1
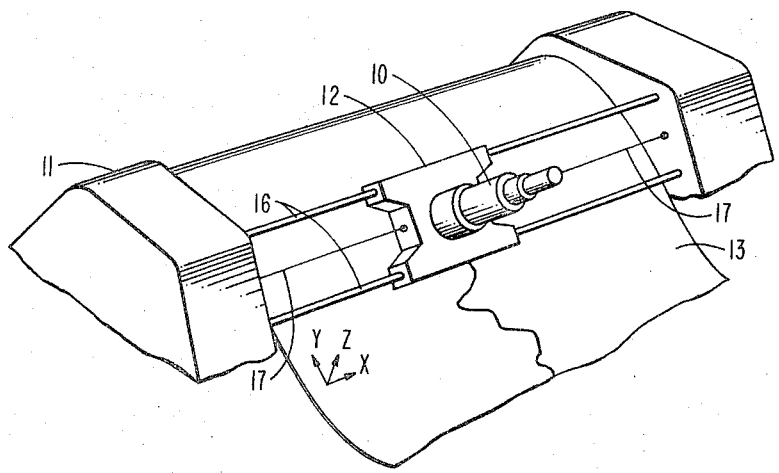
FIG.—1
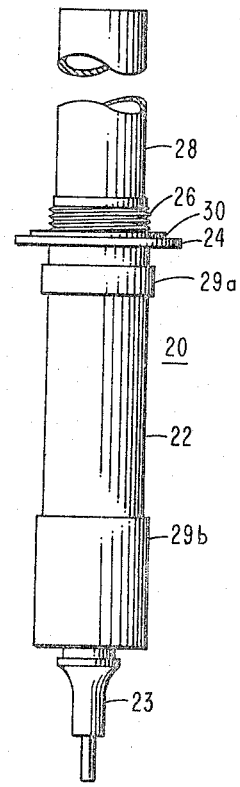
FIG.—2
FIG.—3
INVENTORS
FRITZ E. KLASSEN
DONALD G. MILLER
BY Albert Rosen
Fraser and Bogucki
ATTORNEYS

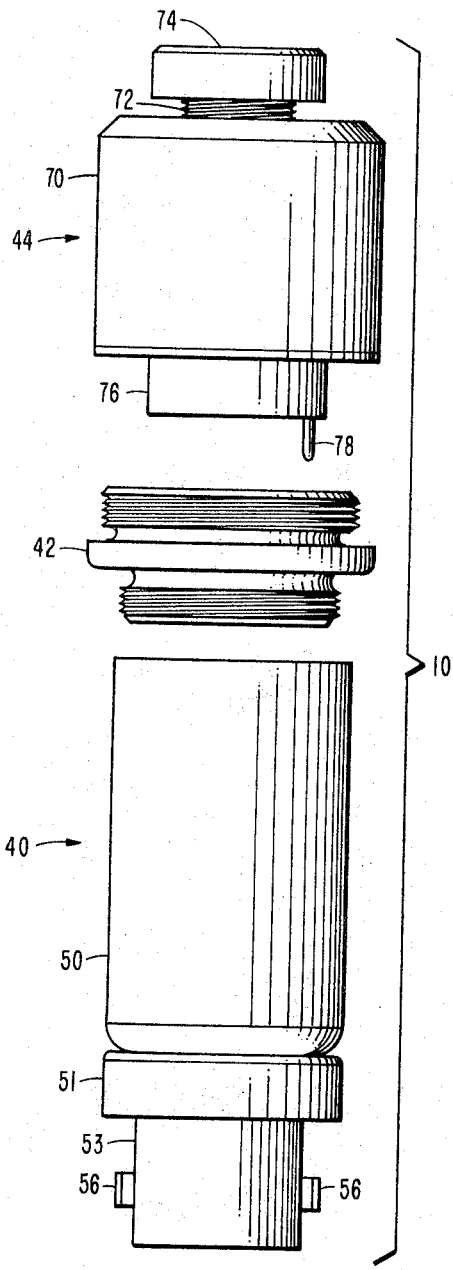
FIG.—4
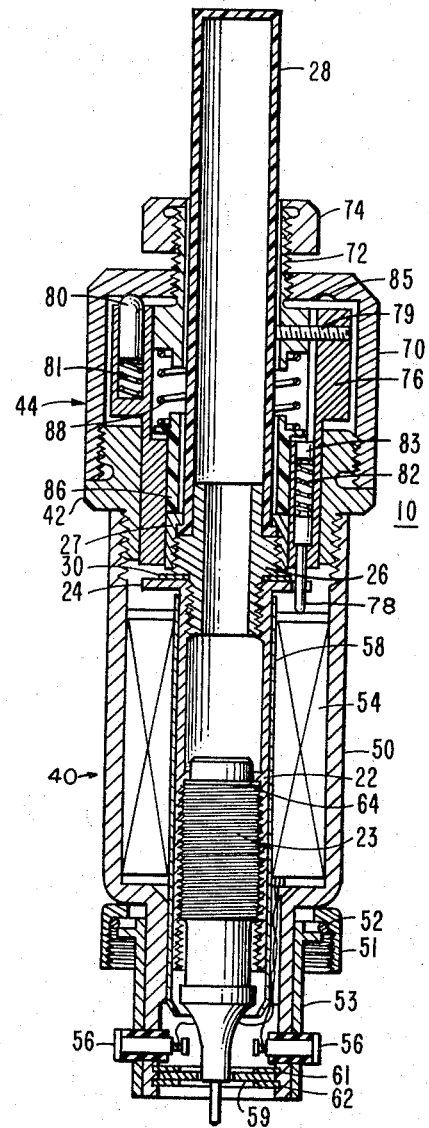
FIG.—5
INVENTORS
FRITZ E. KLASSEN
DONALD G. MILLER
BY *Albert Rosen*
*Fraser and Bogucki*
ATTORNEYS

United States Patent Office 3,340,541
Patented Sept. 5, 1967

3,340,541
HIGH SPEED PEN ACTUATING MECHANISM
Fritz E. Klassen, Los Alamitos, and Donald G. Miller, Long Beach, Calif., assignors to California Computer Products, Inc., Anaheim, Calif., a corporation of California
Filed Jan. 18, 1965, Ser. No. 426,113
12 Claims. (Cl. 346—140)

This invention relates to data plotting devices, and more particularly to a recording mechanism for a data plotting system.

Modern data plotting systems are controlled at high speed in order to leave one or more traces on an associated plotting medium, such as a section of graph paper. The data recorders employed in such systems conventionally control a pen to write on a strip of chart paper moved by a drum or, alternatively, they may produce the record on a fixed sheet of graph paper mounted on a plotting board of the so-called X–Y recorder type. In any event, a well defined indelible trace is necessary for virtually all records produced by the plotting system and in virtually all recorders except those which operate at such high speeds that special technologies are necessary, an ink pen or a ball point mechanism is employed. Of these, the ink pen is preferred because of deficiencies in the common ball point mechanism, such as a tendency to skip, the requirement of additional force on the paper, and the like.

Heretofore, however, even ink pens have not been entirely satisfactory for use as the recording instrument of a data plotting device. Various attempts have been made to produce special configurations of ink-type typewriting instruments for use in recording mechanisms without singular success. In addition to the problems inherent in providing an ink writing instrument which is absolutely reliable under the control of any mechanically operated mechanism, these developments suffer from the additional disadvantage of increased cost in providing a specialized writing instrument.

There is on the market and commercially available a standardized reliable ink pen design which may be adapted for high speed, intermittently actuated recording devices. A preferred type of such design for use in an automatic data plotter is sold under the "Rapidograph" and "Acetograph" trademarks, manufactured by the Koh-I-Noor Company. Such pens are also available in a fountain pen design, but for automatic data plotter use the preferred configuration is a simple pen mechanism with a replaceable ink cartridge that is readily attachable to the pen mechanism. These pens come in different sizes of writing points and with various colors of ink available in the replacement cartridges. The assembled pen mechanism, however, is of a uniform size and configuration so that one pen may be easily substituted for another in an associated actuating mechanism.

One of the distinguishing features of this particular type of pen mechanism is its structure for overcoming the problem of ink drying on the pen point during periods of non-use. The pen mechanism has an internal cleaning wire or needle extending through the hollow tip or point which engages the record medium. The cleaning wire has an attached weight, so that tipping of the pen or sudden axial movement thereof causes an internal movement of the cleaning wire within the tip which results in the fracture of dried ink clots and thereby releases ink for free flow through the hollow tip to the recording medium. Thus the ink from the associated cartridge reservoir of the pen mechanism is enabled to flow freely through the hollow point to provide the desired permanent trace upon the recording medium, whenever the pen mechanism is in use. This type of pen is noted for its uniformity and consistency of flow and for the relatively high volume ink supplies which are provided by the associated ink cartridges. It may be seen that after along period of non-use, the pen may be prepared for use simply by movement of the cleaning wire within the hollow tip to restore full ink flow.

The type of modern high speed plotter which places particularly severe demands on associated writing instruments is that which is known as the digital incremental plotter. This device operates at high speed in response to commands from a data processing system or a digital tape transport or the like. In this type of plotter, a carriage upon which the pen recording instrument is mounted moves under the control of these commands in both the X and Y axes (Cartesian coordinates) in equal increments or steps which may be effected separately or simultaneously. In addition to the movement of the pen carriage along the X and Y axes, the pen may be raised or lowered into contact with the record medium under the control of an actuating mechanism mounted on the pen carriage and arranged to transport the pen in the Z axis direction, such axis being perpendicular to the recording medium. Digital plotting systems capable of several hundred X- and Y- axes steps per second, and of forty or fifty Z-axis movements per second of the recording instrument are in widespread use. With such rapid control of the recording instrument, it is clear that not only must the pen mechanism be as free as possible from skips and other malfunctions so that a reliable trace may be established when called for, but the associated actuating mechanism must be capable of rapid and positive response in controlling the recording instrument to make contact against the paper or to be withdrawn therefrom in a retracted position. In order that the recording pens may be easily removed for replacement or refilling, the pen actuating mechanism should be readily disassemblable. Furthermore, following such disassembly and the insertion of a new pen, the actuating mechanism should be capable of reassembly with speed and assurance to the same tolerances and clearances as previously existed. In addition, it is desirable to have the actuating mechanism adjustable to known tolerances so that the clearance between the pen and the paper may be easily determined and simply adjusted.

It is therefore a general object of the present invention to provide an improved pen actuating mechanism.

More particularly, it is an object of the present invention to provide an improved pen actuating mechanism which is capable of functioning as a satisfactory recording instrument in a high speed data plotting system.

It is a further object of the present invention to provide a pen actuating mechanism capable of controlling the clearance between a pen and a recording medium to close tolerances.

It is also an object of the present invention to provide a pen actuating mechanism which may be readily disassembled and in which the clearance between the pen and the recording medium may be easily adjusted.

In brief, particular arrangements in accordance with the present invention involve a pen actuating mechanism having a movable plunger in which a pen and ink cartridge may be mounted. The plunger is part of a magnetic circuit controlled by an associated solenoid for retracting the pen away from the recording medium in response to applied electrical pulses. Thus the plunger serves as an armature in an electromagnetic field actuating mechanism and is particularly shaped in conjunction with other portions of the magnetic circuit to provide retraction of the pen effectively and efficiently. The pen body and cap assembly are shaped in conjunction with the configuration of the movable plunger so as to provide a low reluctance path for magnetic flux throughout the magnetic circuit, particularly in those regions where the magnetic flux necessarily crosses air gaps between various portions of the magnetic circuit. For example, in the region of such air gaps, an extended cross sectional area of magnetic material is provided on both sides of an air gap to minimize leakage flux and magnetic reluctance across the gap.

The movable plunger forms one pole of an active air gap in the magnetic structure across which work is done in moving the plunger to close this gap when the associated coil assembly is energized. The opposite pole of the active air gap is provided by an axially adjustable mechanism which may be adjusted to vary the length of the active air gap in order to accommodate tolerances encountered in various data plotters in which a given pen mechanism may be employed.

In accordance with an aspect of the invention, the adjustable pole mechanism may be provided with a spring loaded detent pin which slides along a plurality of spaced notches in a cap affixed to the pen body so that a given adjustment is established for a movement of the detent pin between any two adjacent notches. In accordance with another aspect of the invention, a plunger pin is employed to engage a portion of the plunger without restraining the axial movement thereof. This arrangement advantageously prevents the pen from being rotated as a recording trace is being drawn, thus eliminating a possible source of undesirable aberration in the recorded trace.

In one particular arrangement in accordance with the invention, a thin resilient spacer is affixed to one of the pole faces to provide a cushioning effect to the upward movement of the pen plunger and also to effect a more rapid release of the plunger when the retracting electromagnetic field is terminated. A particular configuration of the plunger body is employed to establish the proper alignment thereof within the pen body with a minimum of friction to the movement of the plunger. In addition, an ink barrier element is provided at the base of the ink reservoir within the plunger at the point of attachment of the pen therein in order to prevent the leakage of ink around the outside of the pen.

A better understanding of the invention may be had from a consideration of the following detailed description, taken in conjunction with the accompanying drawings, in which:

FIG. 1 is a diagram of a portion of a data plotter in which arrangements in accordance with the present invention may be employed;

FIG. 2 is a view of a pen device having a particular configuration adapted for use in various arrangements of the present invention;

FIG. 3 is a view of a particular portion of the arrangement shown in FIG. 1, partially broken away to disclose interior details thereof;

FIG. 4 is a view of various subassemblies of one particular arrangement in accordance with the present invention in which the pen mechanism of FIG. 2 may be inserted; and FIG. 5 is a detailed section drawing showing the combination of the structures of FIGS. 2 and 4 as assembled for use in the data plotter of FIG. 1.

An inking mechanism 10 in accordance with the invention is shown generally in FIG. 1 as it may be used in conjunction with a data plotter, and in further detail in FIGS. 2–5. The mechanism 10 is mounted on a movable carriage 12 of a digital incremental plotter 11 which may be controlled in the X, Y and Z axis directions relative to a recording medium such as the paper 13. The plotter 11 may be one, for example, that is connected to receive writing signals from a digital computer (not shown). Since such plotters are well-known, a detailed description need not be provided here. It will be understood that in response to X and Y control signals of either polarity, a relative movement of the inking mechanism 10 may be effected in incremental steps along either of the X or Y axes or on both axes simultaneously at high speeds. Because the steps chosen may be relatively small, the recorded plots which are prepared on the recording medium 13 may be continuous, discontinuous, or may have any arbitrary form with a relatively high degree of resolution of individual curve segments. These continuous patterns may be provided by appropriate withdrawal of the inking mechanism 10 from the recording paper 13 under applied Z axis control signals with return of the applicator of the inking mechanism 10 to contact with the recording medium 13 by means of a spring when the Z axis control signal is removed. When, as described above, a sequence of writing commands necessitates a number of withdrawals and returns to the recording paper 13 within a short period of time and at relatively high speed, inking mechanisms according to the prior art may not be capable of performing the desired functions adequately. As will be described, the pen actuating mechanism of the present invention achieves the desired high speed repetitive movement in the Z axis direction without loss or interruption of the ink flow when the pen is in contact with the recording medium 13.

It is preferred to employ a standard drafting instrument for inking purposes, such as an inking pen instrument using the internal cleaning wire and weight construction previously mentioned as, for example, supplied by the Koh-I-Noor Company under the trade names "Rapidograph" and "Acetograph." By the provision of a simple adaptor threaded to match the standardized external threading on such pens, a standard pen holder may be utilized and a wide variety of point sizes and configurations may be interchanged at will simply by withdrawing one and threading in another. Furthermore, the pens may utilize replaceable ink cartridge constructions so that they may readily be reloaded as interchanged, and provide ink reservoirs of suitable large capacity.

As shown in FIG. 1, the carriage 12 on which the inking mechanism 10 is mounted is supported on and movable along the stationary transverse rod elements 16. In the data plotter configuration shown in FIG. 1, the recording paper 13 itself is moved along what may be regarded as the Y axis, while movement of the carriage 12 along the stationary transverse rods 16 constitutes movement on the X axis. Flexible, insulated leads 17 are shown coupled to the carriage 12 and serve both to control the position of the carriage 12 along the transverse rods 16 and also to complete a circuit path for applying Z axis control pulses to the writing mechanism 10 for controlling the movement of the pen toward and away from the recording paper 13.

Although the arrangement shown in FIG. 1 provides for the movement of the recording paper 13 to establish a Y axis trace, the same plotting capability of the writing mechanism 10 may be achieved for a flat bed recorder by the use of a movable mechanism in the form of a second movable carriage on which the transverse rods 16 may be mounted for controlling the position of the inking mechanism 10 and the carriage 12 in the Y direction.

FIG. 2 shows one particular arrangement of a pen assembly 20 for use as a retractable portion of the writing mechanism 10 of FIG. 1. The pen assembly 20 is shown comprising a pen plunger 22 within which the pen 23 may be threadably mounted. The pen plunger 22 is provided with an extending flange 24 which serves as one of the two annular pole pieces establishing the operative gap of the magnetic circuit which controls the axial movement of the pen 23. A plunger adaptor 26 is threaded into the upper end of the pen plunger 22. A pen reservoir 28, conventionally formed of a plastic cylinder, is slipped onto the upper end of the adaptor 26 to complete the pen assembly 20. In the particular arrangement of the pen assembly 20 shown in FIG. 2, it will be noted that the pen plunger 22 is provided with a pair of bands 29a and 29b extending about the body of the pen plunger 22 adjacent opposite ends thereof. These bands 29a and 29b may be formed by machining away part of the intervening portion of the pen plunger 22 and advantageously serve the purpose of reducing the friction and improving the alignment of the pen plunger 22 as it moves up and down within the inking mechanism 10 under the influence of a magnetic field established by the applied Z-axis control pulses. The lower band 29b is of extended width so as to provide the desired minimum air gap in the region where the lower portion of the pen plunger 22 passes magnetic flux to the adjacent portion of the magnetic circuit, shown more completely in FIG. 5. The pen plunger 22, being part of the magnetic circuit controlling the axial movement of the pen 23, is preferably fabricated of B–1113 steel to develop the desired magnetic properties. A pen plunger flange washer 30 is positioned between the adaptor 26 and the flange 24, extending outwardly beyond the periphery of the adaptor 26. This washer is preferably of .005 inch Mylar and serves the dual purpose of providing a desired seal between the adaptor 26 and the pen plunger 22 and also of maintaining a minute space in the operative air gap between the annular pole piece of the flange 24 and the associated pole piece to prevent the sticking of these two pieces when the magnetic field is terminated.

FIG. 3 is a partially broken away view of the carriage 12 showing the threaded coupling on which the inking mechanism 10 is mounted and the manner in which electrical connections are provided thereto for the purpose of applying the Z axis control pulses to a solenoid within the mechanism 10. The carriage 12 is shown comprising a base portion 32 having a pair of apertures at opposite ends through which the transverse rods 16 may be positioned and with a threaded extension 34 on the upper side of the base portion 32 to which the inking mechanism 10 may be threadably coupled. The carriage 12 has a hollow opening extending downwardly through the threaded portion 34 and the base portion 32 through which the lower portion of the inking mechanism 10 extends so that the pen point may make contact with the associated recording medium 13 when the inking mechanism 10 is coupled in position on the carriage 12. A pair of wipers 36 are partially shown mounted within the base portion 32 of the carriage 12 for the purpose of making contact with appropriately mounted terminals on the lower end of the inking mechanism 10 when the latter is coupled to the carriage 12. These wipers 36 are connected respectively to the leads 17 to complete the electrical circuit between the actuating coil within the inking mechanism 10 and the Z axis control circuit (not shown) of the data plotting mechanism of FIG. 1.

FIG. 4 is a view of the inking mechanism 10 showing the various sub-assemblies thereof as disassembled and with the pen assembly of FIG. 2 removed. The sub-assemblies as shown in FIG. 4 are the pen body and the coil assembly 40, the body adaptor 42 and the cap assembly 44. The inking mechanism 10 is shown in further detail in a sectional view thereof presented in FIG. 5. Considering FIGS. 4 and 5 together, it may be seen that the pen body and coil assembly 40 comprises a pen body 50 to which a threaded collar 51 is attached by means of an O ring 52 and an outer sleeve 53 which is press fitted over the outside of the pen body 50 at the lower end thereof. The collar 51 is internally threaded for coupling to the upper extended portion 34 of the carriage 12 (FIG. 3). The pen body and coil assembly 40 also includes a solenoidal coil 54 which is electrically connected to a pair of terminals 56 which are positioned near the base of the inking mechanism 10 to make contact with the wipers 36 of the carriage 12 when the inking mechanism 10 is mounted thereon. The pen body and coil assembly 40 is completed by an inner sleeve 58, a protector washer 59 for the purpose of keeping dust and extraneous material out of the interior of the assembly, and upper and lower retainer springs 61 and 62 for holding the protector washer 59 in position. The inner sleeve 58 forms a surface within which the pen plunger 22 is positioned for freely sliding movement up and down under the control of the magnetic field established by the coil 54.

It will be noted that in the particular arrangement in accordance with the invention shown in section in FIG. 5, the pen plunger 22 does not incorporate the bands 29a and 29b which are shown in the pen plunger configuration of FIG. 2 but rather provides a continuous smooth surface making sliding contact with the inner sleeve 58 over a major extent thereof. In accordance with an aspect of the invention, an ink barrier band 64 which may be fabricated of a material, such as Teflon, which is not wettable by ink used in the pen assembly 20 is positioned near the top of the pen 23 as the latter is threadably mounted within the pen plunger 22. This prevents the unwanted flow of ink from the ink reservoir around the sides of the pen 23, which might otherwise occur as the pen assembly 20 is rapidly moved up and down under the control of the magnetic field of the solenoid coil 54.

The pen cap assembly 44 includes the pen cap 70 into which a pen adjustor 72 is threaded at the upper end thereof. A pen adjustor cap 74 is threaded onto the top of the pen adjustor 72. A pen slide 76 from which extends a plunger pin 78 is positioned within the pen cap 70. The lower end of the pen slide 76 forms the annular pole piece to which the flange 24 is attracted when the solenoidal coil 54 is energized. Within the cap 70 the pen slide 76 is rigidly affixed to the pen adjustor 72 by means of a roll pin 79. The pen slide 76 is drilled with suitable recesses for receiving the plunger pin 78 and a detent pin 80. The plunger pin 78 is urged downwardly by a plunger pin spring 82 which is held in place by a set screw 83. The detent pin 80 is urged upwardly by a detent pin spring 81 so that the nose of the detent pin 80 is made to bear against the inner surface at the top of the pen cap 70. This surface is provided with a plurality of notches 85 equally spaced about a circle and adapted to receive the nose of the detent pin 80. The peripheral spacing between the notches 85 and the spacing of the threads of the pen adjustor 72 are such that a rotation of the pen slide 76 by an amount which moves the detent pin 80 from one notch 85 to the next produces an axial movement of the pen adjustor 72 by .006 inch. Thus the height of the pen 23 relative to a record medium 13 may be easily adjusted in precisely fixed increments simply by rotating the pen adjustor cap 74 and pen adjustor 72 and counting the notches 85 across which the detent pin 80 is rotated. The movement of the detent pin 80 from one notch 85 to the next is readily noted as the pen adjustor cap 74 is rotated by hand.

The pen cartridge 28 is retained in position on the plunger adaptor 26 by means of a ferrule 27 which engages a lip of the cartridge 28 and is threaded onto the plunger adaptor 26. A pen sleeve 86 bears against the upper side of the ferrule 27 and is urged downwardly by a pen pressure spring 88 which extends between the pen sleeve 86 and the pen adjustor 72. The pen pressure spring 88 is arranged to provide a downward force of approximately 7 grams against the pen sleeve 86 to move the pen assembly 20 downwardly so that the pen 23 establishes contact with the record medium 13 in the absence of a magnetic field developed by the solenoidal coil 54. By means of this arrangement, the pen assembly 20 is permitted to move up and down relative to the pen slide 76 with the spring force maintained by the pen pressure spring 88 continued constant at approximately 7 grams, regardless of the setting of the pen adjustor 72 which controls the spacing of the pen 23 from the record medium 13.

The pen cap assembly 44 is attached to the pen body and coil assembly 40 by means of the body adaptor 42 which is threaded into each of the two assemblies 40 and 44 respectively. In normal use, the body adaptor 42 remains threaded into the pen cap 70 of the pen cap assembly 44 when the latter is separated from the pen body and coil assembly 40, as is the case when the pen assembly 20 is removed for replacement with another pen 23 or for refilling or replacement of the ink cartridge 28. Upon reassembly, the plunger pin 78 is fitted through a notch in the flange 24 of the pen plunger 22 so as to prevent any rotational movement of the pen assembly 20 relative to the pen mechanism 10 while permitting free axial movement of the pen assembly 20. Furthermore, the plunger pin 78 extends beyond the flange 24 to bear against the solenoidal coil 54 and thereby assist in maintaining the coil 54 in a fixed position.

In operation, the solenoidal coil 54 is energized by applying a Z axis control pulse to the terminals 56 whenever it is desired to withdraw the pen 23 from the surface of the record medium 13. The energized coil 54 thereby develops a magnetic field which produces magnetic flux traversing a path extending from the pen plunger 22 across the operative air gap between the flange 24 and the pen slide 76, through the lower portion of the body adaptor 42 and through the pen body 50 to return to the pen plunger 22 across the short, extended-area air gap between the pen body 50 and the sleeve 58. A similar short, extended-area air gap is provided between the pen slide 76 and the body adaptor 42. The resulting magnetic field causes the pen assembly 20 to move upwardly until the Mylar washer 30 bears against the lower surface of the annular pole piece of the pen slide 76. When the pen 23 is to be returned to contact the record medium 13 in order to write a trace thereon, the Z axis control pulse is terminated, the corresponding magnetic field developed by the solenoidal coil 54 collapses, and the pen assembly 20 moves downwardly under the force of the pen pressure spring 88.

By virtue of the above-described structural arrangement in accordance with the present invention, extremely close clearances between the pen 23 and the record medium 13 are made possible with a corresponding control of pen position at a very rapid rate. For example, a typical arrangement provides for an axial movement of the pen assembly 20 by a distance of from .020 to .025 inch at a Z axis control pulse rate of 40 to 50 pulses per second. As already mentioned, an important aspect of the structural arrangement in accordance with the present invention which makes the close clearances possible is the arrangement of the detent pin 80 and the adjacent notches 85 which precisely determines the tolerance in the position of the pen 23 relative to the record medium 13 by means of the pen adjustor 72 when the entire pen mechanism 10 is initially installed in the carriage 12. The pen body 50 is advantageously constructed of Armco steel and the body adaptor 42 and the pen plunger 22 are fabricated of B-1113 steel in order to provide a magnetic circuit having suitable magnetic properties. The close tolerances made possible by this arrangement of the invention advantageously permits a short operative air gap of less than .050 inch, thereby contributing to the extremely rapid response of the actual movement of the pen assembly 20 under the control of the magnetic field established by the energized coil 54. The air gap between the pen plunger 22 and the pen body 50 at the lower ends thereof and that between the body adaptor and the pen slide are short and both extend over a substantial area relative to the cross-sectional area of the remainder of the magnetic circuit so as to provide a low magnetic flux density at the air gaps and low magnetic reluctance.

Although there have been described above specific arrangements of a high-speed pen actuating mechanism in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, a second annular pole piece opposite the first annular pole piece and adjustably attached to the pen body, means for adjusting incrementally the axial position of the second annular pole piece relative to the pen body, and means for selectively energizing the coil to develop a magnetic field to pull the first and second annular pole pieces together in order to raise the pen to a retracted position.

2. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, a second annular pole piece opposite the first annular pole piece and adjustably attached to the pen body, means for establishing precise fixed increments of axial movement in the adjustment of the axial position of the second annular pole piece relative to the pen body, and means for selectively energizing the coil to develop a magnetic field to pull the first and second annular pole pieces together in order to raise the pen to a retracted position.

3. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, a second annular pole piece opposite the first annular pole piece and threadably connected to the pen body, means for establishing precise fixed increments of axial movement in the adjustment of the axial position of the second annular pole piece relative to the pen body, the increment establishing means comprising a plurality of aligned notches and a releasable detent means which is movable from one notch to the next as the position of the second annular pole piece is adjusted, and means for selectively energizing the coil to develop a magnetic field to pull the first and second annular pole pieces together in order to raise the pen to a retracted position.

4. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, a second annular pole piece opposite the first annular pole piece and attached to the pen body, means for selectively energizing the coil to develop a magnetic field to pull the first and second annular pole pieces together in order to raise the pen to a retracted position, and means including a plunger pin attached to the second annular pole piece for extension through the flange portion of the pen plunger in order to prevent the rotation of the pen while permitting axial movement of the pen plunger.

5. A pen actuating mechanism in accordance with claim 4 further including means releasably extending the plunger pin from the second annular pole piece.

6. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, a second annular pole piece opposite the first annular pole piece, means for adjustably setting the axial position of the second annular pole piece relative to the pen body, means attaching the second annular pole piece to the pen body comprising a pen cap and a body adaptor which may be fitted together with the pen body and which may be readily dissasembled from the pen body to permit replacement of the pen without disturbing the adjustment setting of the second annular pole piece, and means for selectively energizing the coil to develop a magnetic field to pull the first and second annular pole pieces together in order to raise the pen to a retracted position.

7. A pen actuating mechanism for controlling the position of a writing instrument relative to a record medium along an axis substantially perpendicular to the plane of the record medium comprising a pen plunger adapted to receive a pen, the pen plunger having a radially extended flange portion providing a first annular pole piece at the upper end of the pen plunger, a pen body containing a solenoidal coil and encasing the pen plunger, the pen plunger comprising a circular cylindrical element having at least a pair of bands extending about the outer surface of the cylindrical element for maintaining alignment of the pen plunger within the pen body with a minimum of opposition to axial movement of the pen plunger therein, a second annular pole piece opposite the first annular pole piece and attached to the pen body, and means for selectively energizing the coil to develop a magnetic field to pull the first and second annular pole pieces together in order to raise the pen to a retracted position.

8. A pen actuating mechanism for controlling the position of a writing instrument relative to a record medium along an axis substantially perpendicular to the plane of the record medium comprising a pen and pen plunger connected together, the pen plunger comprising a hollow bore fitted and recessed at the lower end thereof to receive the pen and further including means for preventing ink leakage along the outer surface of the pen, the pen plunger having a radially extending flange portion providing a first annular pole piece at the upper end of the pen plunger, a pen body containing a solenoidal coil and encasing the pen plunger and pen, a second annular pole piece opposite the first annular pole piece and attached to the pen body, and means for selectively energizing the coil to develop a magnetic field to pull the first and second annular pole pieces together in order to raise the pen to a retracted position.

9. A pen actuating mechanism in accordance with claim 8 wherein the means for preventing ink leakage comprises an ink barrier band affixed to the upper end of the pen.

10. A pen actuating mechanism in accordance with claim 9 wherein said ink barrier band comprises a material which is not wettable by ink.

11. A pen actuating mechanism comprising: a pen assembly including a pen, a pen plunger in the form of a hollow cylindrical member into which the pen may be mounted at the lower end thereof, the pen plunger having a radially extended flange portion at the upper end thereof to define a first annular pole piece, and a plunger adaptor attached to the upper end of the plunger and adapted to receive an ink reservoir cartridge at the upper end thereof; an annular coil positioned about the pen plunger; a pen body encasing the annular coil and formed of a magnetic material in a configuration which establishes a short, extended-area air gap with the pen plunger at the lower end thereof; enclosing means of a magnetic material threadably connected to the upper end of the pen body, the enclosing means containing a second annular pole piece which is adjustable in predetermined fixed increments of axial position relative to the enclosing means and means for urging the pen plunger to an extended position; and means for selectively energizing the coil to develop a magnetic field to retract the pen and pen plunger.

12. A pen actuating mechanism comprising: a pen assembly including a pen, a pen plunger in the form of a hollow cylindrical member into which the pen may be mounted at the lower end thereof, the pen plunger having a radially extended flange portion at the upper end thereof to define a first annular pole piece, and a plunger adaptor attached to the upper end of the plunger and adapted to receive an ink reservoir cartridge at the upper end thereof; an annular coil positioned about the pen plunger; a pen body encasing the annular coil and formed of a magnetic material in a configuration which establishes a short, extended-area air gap with the pen plunger at the lower end thereof; enclosing means of a magnetic material threadably connected to the upper end of the body, the enclosing means containing a second annular pole piece which is adjustable in axial position relative to the enclosing means and means for urging the pen plunger to an extended position; means for adjusting the axial position of the second annular pole piece including a releasable detent element arranged to define precise fixed increments of movement of the second annular pole piece; and means for selectively energizing the coil to develop a magnetic field to retract the pen and pen plunger.

References Cited
UNITED STATES PATENTS

| | | |
|---|---|---|
| 2,785,039 | 3/1957 | Artzt. |
| 2,891,107 | 6/1959 | Weingart et al. ____ 346—140 X |
| 3,016,612 | 1/1962 | Lynott _____ 346—139 X |
| 3,209,365 | 9/1965 | Fasola _____ 346—140 |

RICHARD B. WILKINSON, *Primary Examiner.*

J. W. HARTARY, *Assistant Examiner.*